(12) United States Patent
Kim

(10) Patent No.: US 7,064,959 B2
(45) Date of Patent: Jun. 20, 2006

(54) METHOD AND APPARATUS FOR RELEASABLY LOCKING AN OPTICAL TRANSCEIVER INTO A CAGE ATTACHED TO AN ELECTRONIC BOARD

(75) Inventor: Daehwan D. Kim, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 10/702,975

(22) Filed: Nov. 6, 2003

(65) Prior Publication Data

US 2005/0099782 A1    May 12, 2005

(51) Int. Cl.
*H01R 13/62* (2006.01)
*H05K 7/18* (2006.01)
*H05K 9/00* (2006.01)

(52) U.S. Cl. .................. 361/732; 361/759; 361/801

(58) Field of Classification Search ............... 361/799, 361/816, 818, 732, 740, 747, 755, 759, 801, 361/798; 439/352, 160; 398/135, 138

See application file for complete search history.

(56) References Cited

U.S. PATENT DOCUMENTS

| | | | | |
|---|---|---|---|---|
| 5,901,263 A | * | 5/1999 | Gaio et al. ................... | 385/92 |
| 6,430,053 B1 | * | 8/2002 | Peterson et al. ............ | 361/728 |
| 6,884,097 B1 | * | 4/2005 | Ice .............................. | 439/160 |
| 6,890,206 B1 | * | 5/2005 | Distad et al. ............... | 439/372 |
| 2003/0206403 A1 | * | 11/2003 | Zaremba ..................... | 361/728 |
| 2004/0110406 A1 | * | 6/2004 | Phillips et al. .............. | 439/352 |

OTHER PUBLICATIONS

"XFP: 10 Gigabit Small Form Factor Pluggable Module," Rev. 3.1, Apr. 2, 2003.

* cited by examiner

*Primary Examiner*—Kamand Cuneo
*Assistant Examiner*—Hung Thanh Nguyen
(74) *Attorney, Agent, or Firm*—Marshall, Gerstein & Borun LLP

(57) ABSTRACT

An apparatus and method for releasably locking an optical transceiver with respect to a cage attached to an electrical board. The cage having a pair of inwardly biased locking tabs extending from the sides thereof. Each tab is moveable between an inner position and outer position corresponding to a locked and unlocked position respectively. The optical transceiver includes a pair of levers operable for engaging and moving the locking tabs between the biased inner position and the outer unlocked position. The locking mechanism includes a pair latches positioned on each side of the transceiver for engaging and moving the levers between first and second positions to lock and unlock the transceiver from the cage.

26 Claims, 4 Drawing Sheets

METHOD AND APPARATUS FOR RELEASABLY LOCKING AN OPTICAL TRANSCEIVER INTO A CAGE ATTACHED TO AN ELECTRONIC BOARD

TECHNICAL FIELD

The present disclosure relates to a locking mechanism for releasably locking an optical transceiver into a cage that is attached to an electronic board, and more particularly, to an optical transceiver designed to comply with the XFP computer protocol.

BACKGROUND

XFP is a protocol agreed to by industry participants to define standard components and architectures for ten gigabit small form factor pluggable modules. The XFP pluggable module is an optical transceiver that has standard features such as outer envelope size, internal electrical specifications, and optical connector ports. Some mechanical design features, such as the locking mechanism for releasably connecting a module to a standard cage attached to a computer board have been left to the component manufactures to develop.

Thus, there is a need for a reliable and inexpensive locking mechanism for securing an optical transceiver to a cage on a computer board and, more generally, there is a need for a locking mechanism for locking components within a standard cage structure that is both inexpensive and reliable.

DETAILED DESCRIPTION

Figure 1:
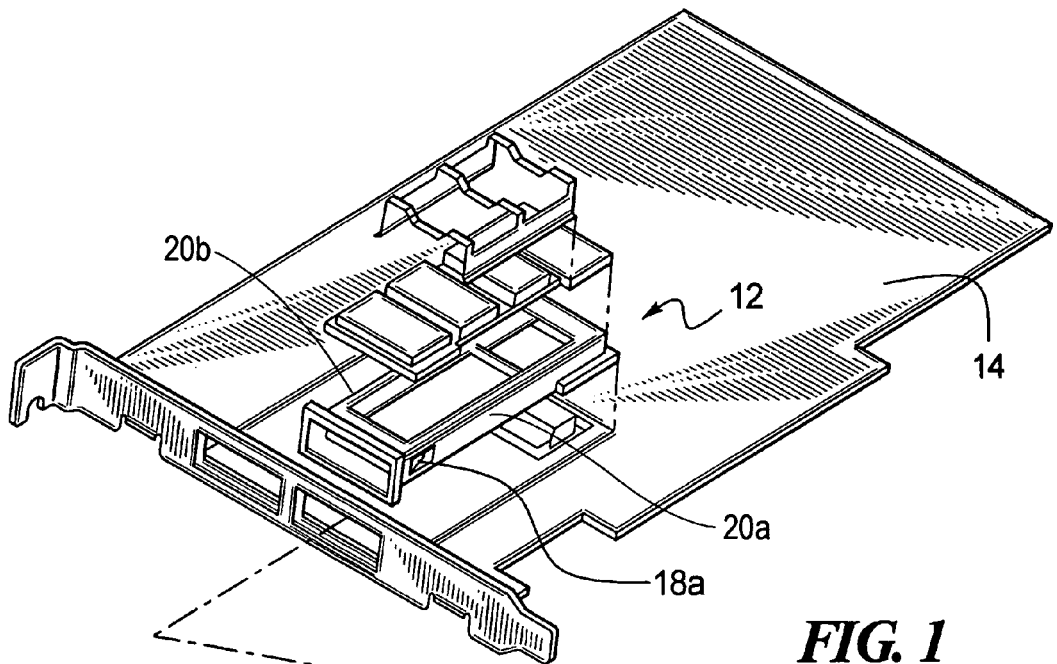
FIG. 1 is an exploded perspective view of a transceiver and cage mounted on an electronic board.

Referring now to the Figures, and more particularly to FIG. 1, an optical transceiver 10 is shown in an exploded view with a cage 12 installed on an electronic board 14. The cage 12 can be permanently installed on the board 14 for providing a connector housing in which the optical transceiver 10 can be installed. The transceiver 10 includes a locking mechanism 16 for releasably locking the optical transceiver 10 with respect to the fixed cage 12. The cage 12 includes a pair of inwardly biased locking tabs 18a, 18b (best seen in FIGS. 3–5) extending from the sides 20a, 20b of the cage 12. Each tab 18a, 18b is moveable between an inner biased position shown in solid line and an outer position substantially flush with the sides 20a, 20b of cage 12, shown in dashed line in FIG. 3. The tabs 18a, 18b are adapted to lockingly engage the transceiver 10 when biased in the inner position and to disengage from the transceiver 10 when forced to the outer position.

Figure 2:
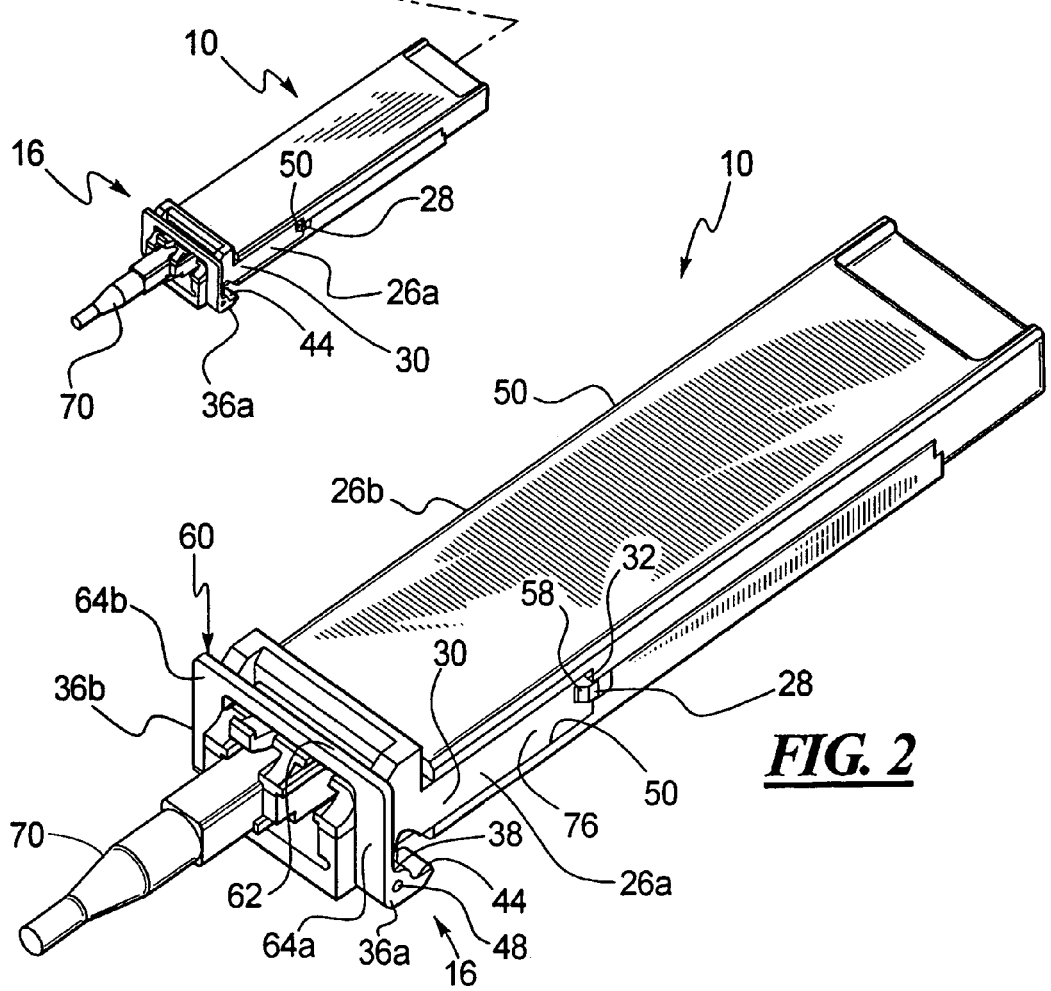
FIG. 2 is an enlarged perspective view of the transceiver shown in FIG. 1.
Figures 3, 4:
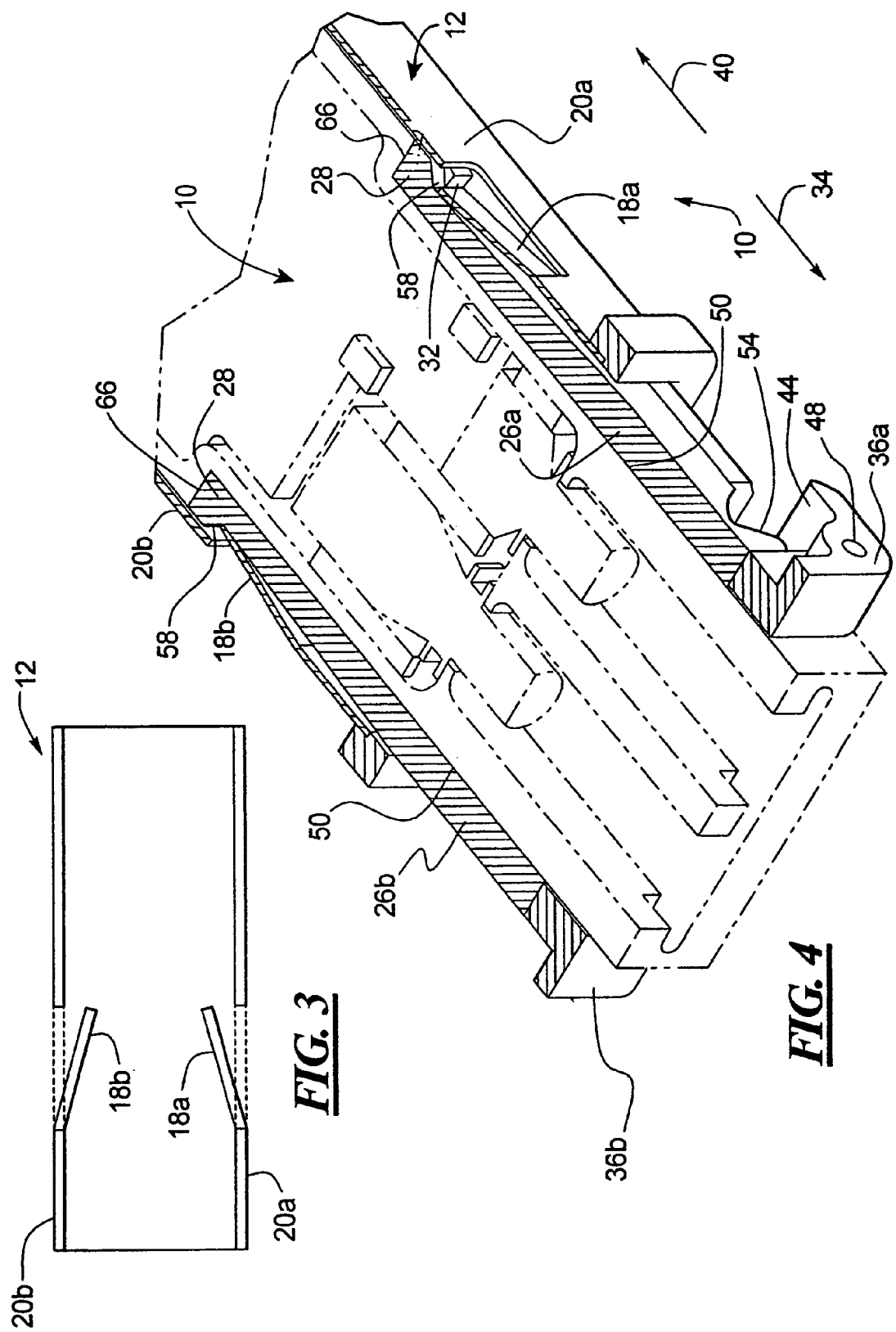
FIG. 3 is a partial cross-sectional view of the cage shown in FIG. 1.
FIG. 4 is a partial cross-sectional view of the transceiver mounted as shown in FIG. 2 in the cage as shown in FIG. 3 in a locked position.

Referring now to FIG. 2, an enlarged view of the locking mechanism 16 is shown. The transceiver 10 includes a pair of levers 26a, 26b, each having first and second ends 28, 30 respectively. Each lever 26a, 26b is operable for engaging one of the locking tabs 18a, 18b (shown best in FIGS. 3–5). The levers 26a, 26b are operable for engaging and moving the locking tabs 18a, 18b from the biased inner or locked position (shown in solid in FIG. 3) to outer or unlocked position (shown in phantom in FIG. 3). In the locked position as shown in FIG. 4, the locking tabs 18a, 18b abut against a shoulder 32 formed on the transceiver 10. The locking tabs 18a, 18b are moved to the outer unlocked position (phantom line in FIG. 3) when the levers 26a, 26b are moved in the direction of the arrow 34 (see FIG. 5). When the locking tabs are unlocked, the transceiver 10 may removed from the cage 12.

A pair of substantially L-shaped latches 36a, 36b is positioned on each side of the transceiver 10. Each latch 36a, 36b includes a first surface 38 (see FIG. 5) for engaging and moving the levers 26a, 26b in the direction of arrow 40 towards a first or locked position shown in FIGS. 4 and 6A. The latches 36a, 36b also include a second surface 44 for engaging and moving the levers 26a, 26b toward a second or unlocked position shown in FIG. 6E. The locked and unlocked positions correspond to the transceiver 10 being locked and unlocked relative to the cage 12. A pair of pivot pins, one of which is shown at 48, extend from the transceiver 10 on opposite sides for pivotally connecting each latch 36a, 36b to the transceiver 10. The first and second surfaces 38, 44 of the latches 36a, 36b extend from the axis of the pins 48 and substantially orthogonally from one another.

The transceiver 10 includes grooved pockets 50 positioned on each side of the transceiver 10 for receiving and permitting the levers 26a, 26b to reciprocatingly slide therein. The first surfaces 38 of the latches 36a, 36b are operable for contacting a first surface 52 (best seen in FIGS. 5 and 6a) of the levers 26a, 26b and moving the levers towards the locked position in the direction of arrow 40 (shown in FIG. 3). The second surfaces 44 of the latches 36a, 36b are operable for contacting a second surface 54 of the levers 26a, 26b and moving the levers 26a, 26b towards the open position in the direction of arrow 34.

In an illustrative embodiment, the levers 26a, 26b include a substantially inverted V-shaped portion having surfaces 54, 56 formed adjacent the second end 30 of the levers 26a, 26b. The forward side of the inverted V-shaped portion defines the second surface 54 that is engageable with the latches 36a, 36b. The latches 36a, 36b engage the surfaces 54 of the levers 26a, 26b when the levers 26a, 26b are moved from the locked position shown in FIGS. 4 and 6A to the unlocked position shown in FIGS. 5 and 6E. The levers 26a, 26b further include an outwardly angled portion 58 formed adjacent the first ends 28 of the levers 36a, 36b (shown best in FIGS. 4 and 5). The outwardly angled portions 58 are operable for engaging the locking tabs 18a, 18b causing the locking tabs 18a, 18b to move into the outer or unlocked position when the levers 36a, 36b are moved in the direction of arrow 34 (best seen in FIGS. 5 and 6E). The outwardly angled portion 58 can extend at a substantially 45 degree angle from a longitudinal axis as shown in the illustrative embodiment, however, one skilled in the art will understand that a range of angles would be effective in actuating the locking tabs 18a, 18b from the inwardly biased position to the outer unlocked position.

Referring again to FIGS. 2 and 6A–6E, the locking mechanism 16 includes a bail 60 extending from the latches 36a, 36b for permitting manual actuation of the latches 36a, 36b between the unlocked (FIG. 6E) and locked (FIG. 6A) positions and vice versa. The latches 36a, 36b will urge the levers 26a, 26b towards the locked position (FIG. 6A) when the bail 60 is rotated in a first direction defined by a curved arrow 62 shown in FIG. 6C. The latches 36a, 36b will urge the levers 26a, 26b towards the unlocked position (FIG. 6E) when the bail 60 is rotated in a second direction defined by a curved arrow 64 shown in FIG. 6D. The bail 60 includes a cross-member 62 extending between two sides 64a, 64b best seen in FIG. 2. The cross member 62 provides an easily accessible member for manually gripping and rotating the bail 60 in a desired direction. The bail 60 is fully closed when further rotation of the bail 60 in the direction of the arrow 62 is restricted by the first ends 28 of the levers 26a, 26b hitting stops 66 defined by distal ends of the pockets 50. The transceiver 10 is locked relative to the cage 12 when the bail 60 is in the closed position shown in FIG. 6A. An optical connector 70, shown in FIG. 2, is only connectable to the transceiver 10 when the bail 60 is in the closed position shown in FIGS. 1, 2, and 6A.

Figure 6A:
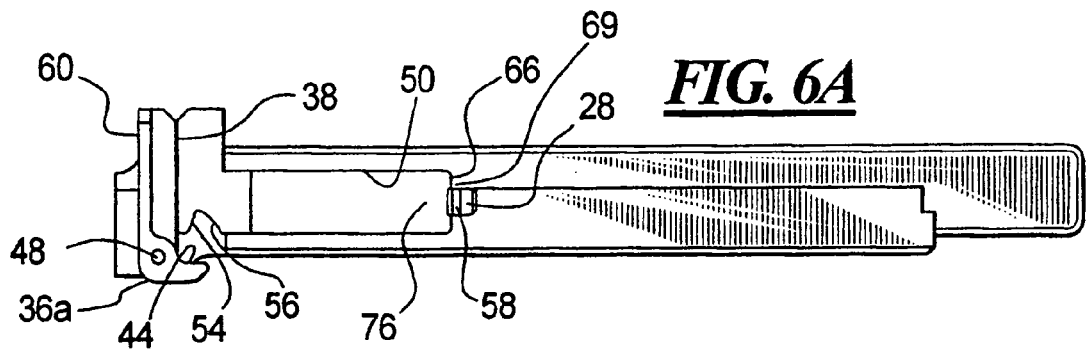
FIGS. 6A–6E show the transceiver with a bail in various positions ranging from fully locked to fully unlocked.
Figure 6B:
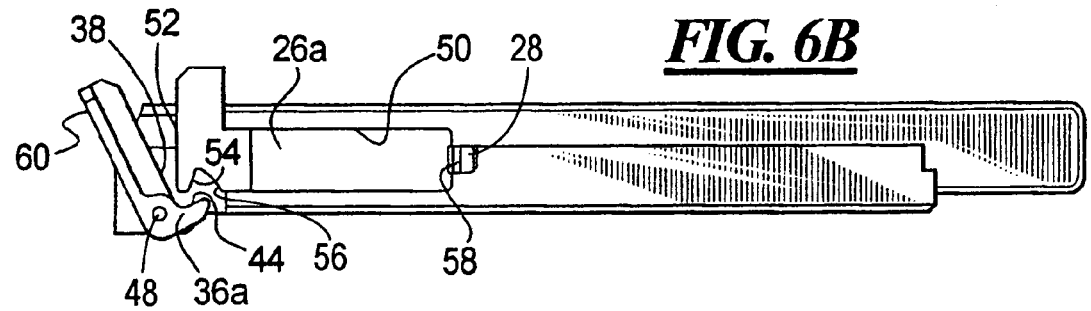
Figure 6C:
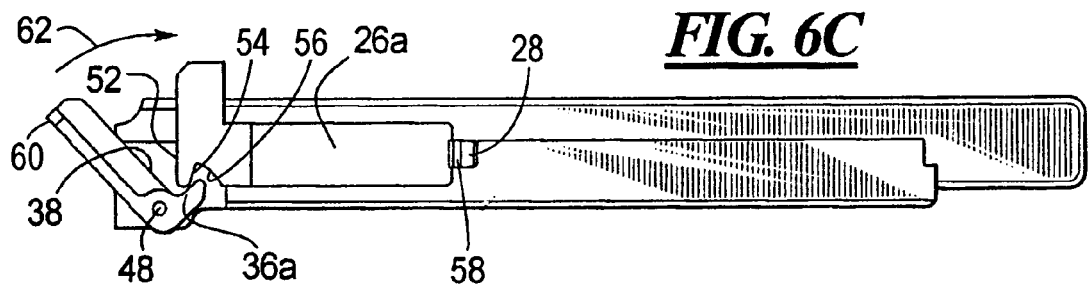
Figure 6D:
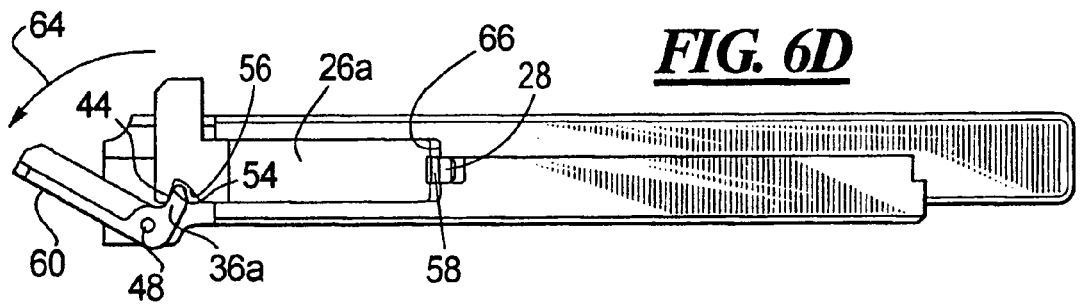
Figure 6E:
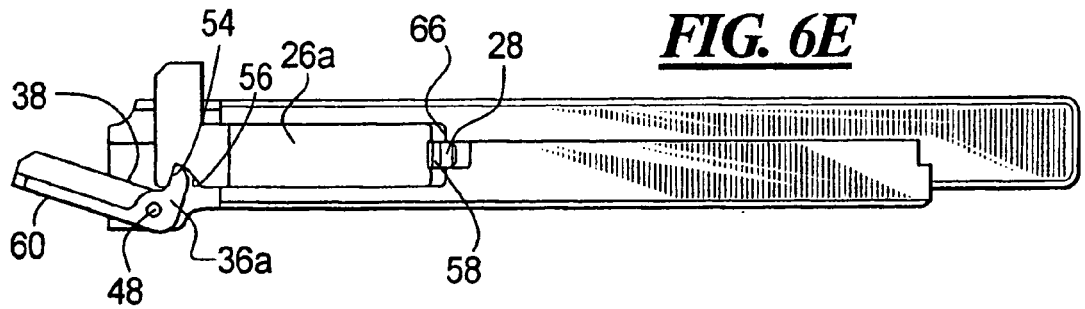

A fully opened position as shown in FIG. 6E is defined by rotating the bail 60 in the direction of the arrow 64 approximately seventy degrees (70°) from the locked position, as shown in FIG. 6A. The transceiver 10 is unlocked and can be removed from the cage 12 when the bail 60 is in the open position. The optical connector 70 is prevented from connecting to the transceiver 10 when the bail 60 is in the open position of FIG. 6E.

The levers 26a, 26b most preferably have a hardened wear resistant material coating 76 added to the outer surfaces thereof. The coating reduces wear from contacting surfaces, such as the grooved pockets 50, the locking tabs 18a, 18b, and the latches 36a, 36b. The coating 76 can be formed from a nickel based material, or as one skilled in the art will readily understand, many other types of material coating such as titanium nitride and/or composite coatings. The coating 76 can be formed on the levers 26a, 26b by any one of a number of methods, some of which can include dipping, electroplating, and spraying. The levers 36a, 36b and bail 60 can be made from any material having mechanical properties adequate for use in this environment, however, die cast zinc alloy is a preferred material.

Figure 5:
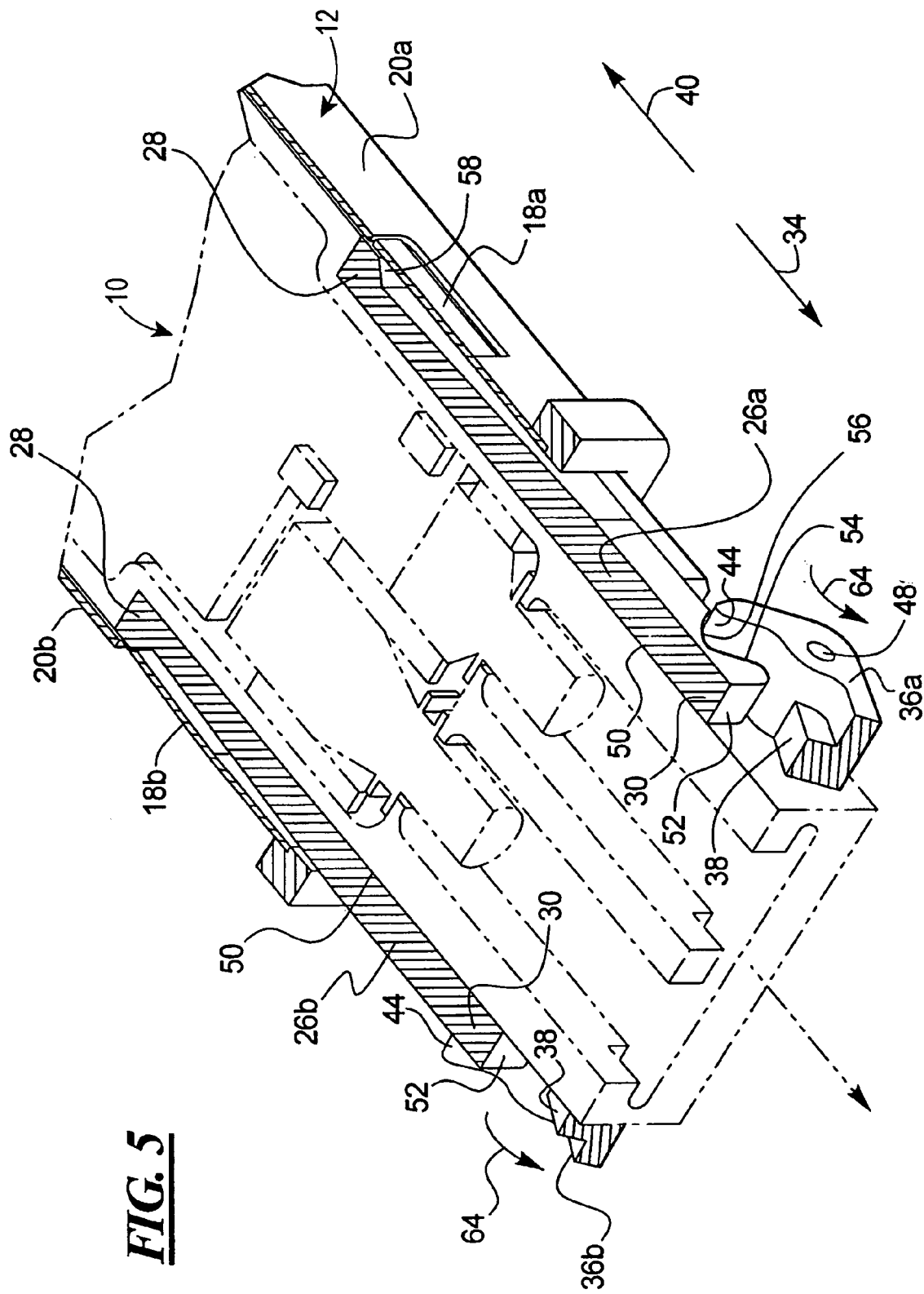
FIG. 5 is another partial cross-sectional view similar to that of FIG. 4 but showing the transceiver mounted into the cage in an unlocked position.

In operation, the transceiver 10 is slid into the cage 12. The bail 60 is manually actuated in the direction of the arrow 62 (see FIG. 6C and generally FIGS. 6E through 6A) such that the latches 36a, 36b make contact with the levers 26a, 26b and move the levers 26a, 26b in the direction of arrow 40 as shown in FIGS. 3 and 4. The angled portions 58 of the levers 26a, 26b engage the inwardly biased locking tabs 18a, 18b causing the tabs 18a, 18b to move to the outer position substantially flush with the sidewalls 20a, 20b as shown in FIG. 5. After the angled portions 58 traverse past the locking tabs 18a, 18b, the tabs 18a, 18b then move back to the biased inward locking position shown best in FIGS. 4 and 6A. The bail 60 is fully closed when the levers 26a, 26b hit stops 66 defined by the ends of the pockets 50. The transceiver 10 is locked into the cage 12 and an optical connector 70 can be attached to the transceiver 10 when the bail 60 is in the closed or locked position shown in FIG. 6A.

All optical connectors 70 must be disconnected from the transceiver 10 prior to removing the transceiver 10 from the cage 12. After the optical connectors 70 are disconnected, the bail 60 can be manually rotated in the direction defined by arrow 64 (FIG. 6D). The second surface 44 of each latch 36a, 36b contacts the second surfaces 54 of the levers 26a, 26b causing the levers 26a, 26b to move in the direction defined by arrow 34 shown in FIGS. 3 and 4, when the bail 60 is rotated in the second direction defined by arrow 64 in FIG. 6D. The outwardly angled portions 58 of the levers 26a, 26b actuate the locking tabs 18a, 18b toward the outer or unlocked position (FIGS. 5 and 6E) allowing the shoulder 32 of the transceiver 10 to slide past the tabs 18a, 18b. The bail is shown in various positions (FIGS. 6B, 6C, and 6D) between fully closed (FIG. 6A) and fully open (FIG. 6E). When the bail 60 is open the transceiver 10 can be removed from the cage 12.

One of the advantages of this bail latch/delatch design is the unique shape of the bail 60, which allows the user to pull down the bail 60 from the top with one finger or from side with both a thumb and an index finger. Either mode of operation can be chosen based on the module configuration depending on how the multiple units are stacked and arranged in an electronic chassis.

Although certain examples have been disclosed and described herein in accordance with the teachings of the present invention, the scope of coverage of this patent is not limited thereto. On the contrary, this patent covers all embodiments of the teachings of the invention fairly falling within the scope of the appended claims, either literally or under the doctrine of equivalents.

What is claimed is:

1. A locking mechanism for releasably locking an optical transceiver with respect to a fixed cage, the cage having a pair of inwardly biased locking tabs extending therefrom, each tab being movable between an inner position and an outer position, the tabs adapted to lockingly engage the transceiver when biased in the inner position and to disengage from the transceiver when forced to the outer position, the locking mechanism comprising:

a pair of levers having first and second ends positioned on opposing sides of the transceiver, each lever being engageable with one of the locking tabs for moving the locking tabs from the biased inward locking position to an outer unlocked position; and a pair of substantially L-shaped latches positioned on each side of the transceiver, each latch having a first surface for engaging at least one lever and moving the at least one lever towards a first position and a second surface for engaging the at least one lever where said second surface engagement with the at least one lever moves the at least one lever towards a second position, the first and second positions corresponding to the transceiver being locked and unlocked, respectively.

2. The locking mechanism of claim 1, further comprising:

a bail extending from the latches for permitting manual actuation of the latches, the latches urging the levers toward the first position when the bail is rotated in a first direction and the latches urging the levers toward the second position when the bail is rotated in a second direction.

3. The locking mechanism of claim 2, wherein the bail further comprises:

a cross member extending between the latches for permitting manual gripping thereof and rotating the bail.

4. The locking mechanism of claim 1 further comprising:

a pair of pivot pins extending from the transceiver for pivotally connecting each latch to the transceiver.

5. The locking mechanism of claim 4, wherein the first and second surfaces of each latch extend from the pins substantially orthogonally from one another.

6. The locking mechanism of claim 1, wherein the transceiver includes a grooved pocket on each side for permitting the levers to slidingly engage therein.

7. The locking mechanism of claim 1, wherein the first surface of the latches contacts a first surface of the levers when moving the levers toward the first position.

8. The locking mechanism of claim 1, wherein the second surface of the latches contacts a second surface of the levers when moving the levers toward the second position.

9. The locking mechanism of claim 8, wherein the levers further comprise:
a substantially inverted V-shaped portion formed adjacent the second end thereof, one side of the V-shaped portion defining the second surface of the levers engageable with the latches.

10. The locking mechanism of claim 9, wherein the latches engage the inverted V-shaped portion of the levers when the levers move from the first position toward the second position.

11. The locking mechanism of claim 1, wherein the levers further comprise:
an outwardly angled portion formed adjacent the first ends of the levers for engaging the locking tabs and causing the locking tabs to move into the unlocked position when the levers move toward the second position.

12. The locking mechanism of claim 11, wherein the outwardly angled portion extends at a substantially forty-five degree angle from a longitudinal axis.

13. The locking mechanism of claim 2, wherein a closed position is defined by rotating the bail in the first direction until further rotation is restricted by a first stop.

14. The locking mechanism of claim 13, wherein transceiver is locked relative to the cage when the bail is in the closed position.

15. The locking mechanism of claim 13, wherein an optical connector is connectable to the transceiver when the bail is in the closed position.

16. The locking mechanism of claim 2, wherein an open position is defined by rotating the bail in the second direction until further rotation is restricted by a second stop.

17. The locking mechanism of claim 16, wherein the transceiver is unlocked from the cage when the bail is in the open position.

18. The locking mechanism of claim 16, wherein an optical connector is prevented from connecting to the transceiver when the bail is in the open position.

19. The locking mechanism of claim 1 further comprising:
a hardened wear resistant material coating formed on the outer surface of the levers for reducing wear caused by contacting surfaces.

20. The locking mechanism of claim 19, wherein the coating is formed from a nickel based material.

21. A method for locking a transceiver with respect to a cage having at least one inwardly biased locking tab comprising:
manually actuating a bail in a first direction;
contacting at least one lever with a first surface of at least one latch;
moving the at least one lever in a first direction until the at least one lever passes the at least one locking tab, permitting the at least one locking tab to move to the biased position and lock the transceiver in the cage;
manually actuating the bail in a second direction;
contacting the at least one lever with a second surface of the at least one latch; and
moving the at least one lever in a second direction under force from the second surface contacting the at least one lever until the at least one lever actuates the at least one locking tab to an unlocked position.

22. A computer board assembly comprising:
an electronic computer board;
a cage mounted to the computer board, the cage having a pair of inwardly biased locking tabs extending therefrom, each tab being movable between an inner position and an outer position;
an optical transceiver adapted to lockingly engage with the cage when the tabs of the cage are biased in the inner position and the optical transceiver adapted to unlock from the cage when the tabs are forced to the outer position;
a pair of levers having first and second ends positioned on opposing sides of the transceiver and moveable between first and second positions, the levers adapted to permit the locking tabs to move toward the biased inward locking position when the levers are moved toward the first position, and the levers adapted to engage and move the locking tabs to the outer unlocked position when the levers move toward the second position; and
a locking mechanism having a pair of substantially L-shaped latches, each latch having first and second contact surfaces for engaging at least one of the levers and actuating the at least one of the levers between the first and second positions, respectively, wherein engagement of the second contact surfaces of the latches moves the levers toward the second position.

23. The computer board assembly of claim 22, wherein the locking mechanism further comprises:
a bail extending from the latches for permitting manual actuation of the latches, the latches urging the levers toward the first position when the bail is rotated in a first direction and the latches urging the levers toward the second position when the bail is rotated in a second direction.

24. A locking mechanism for releasably locking an optical transceiver with respect to a fixed cage, the cage having a pair of inwardly biased locking tabs extending therefrom, each tab being movable between an inner position and an outer position, the tabs adapted to lockingly engage the transceiver when biased in the inner position and to disengage from the transceiver when forced to the outer position, the locking mechanism comprising:
a pair of levers having first and second ends positioned on opposing sides of the transceiver, each lever being engageable with one of the locking tabs for moving the locking tabs from the biased inward locking position to an outer unlocked position; and
a pair of L-shaped latches positioned on each side of the transceiver, each latch having a first surface for engaging at least one lever and applying a first force to the at least one lever and in a direction toward the locking tabs for moving the locking tabs toward the inward locking position and a second surface for engaging the at least one lever and applying a second force to the at least one lever and in a direction opposite the locking tabs for moving the locking tabs from the biased inward locking position to the outer unlocked position.

25. The locking mechanism of claim 24, wherein the levers further comprise an inverted portion formed adjacent the second end thereof and defining a surface engageable with the second surface of the L-shaped latches, wherein the second force in the direction opposite the locking tabs is applied to the surface engageable by the second surfaces of the L-shaped latches when the L-shaped latches are in a first position.

26. The method of claim 21, wherein moving the at least one lever in a second direction under force from the second surface contacting the at least one lever comprises engaging the second surface with a substantially inverted V-shaped portion on the at least one lever, the substantially inverted V-shaped portion defining a surface for engaging the second surface of the at least one latch.

* * * * *